UNITED STATES PATENT OFFICE.

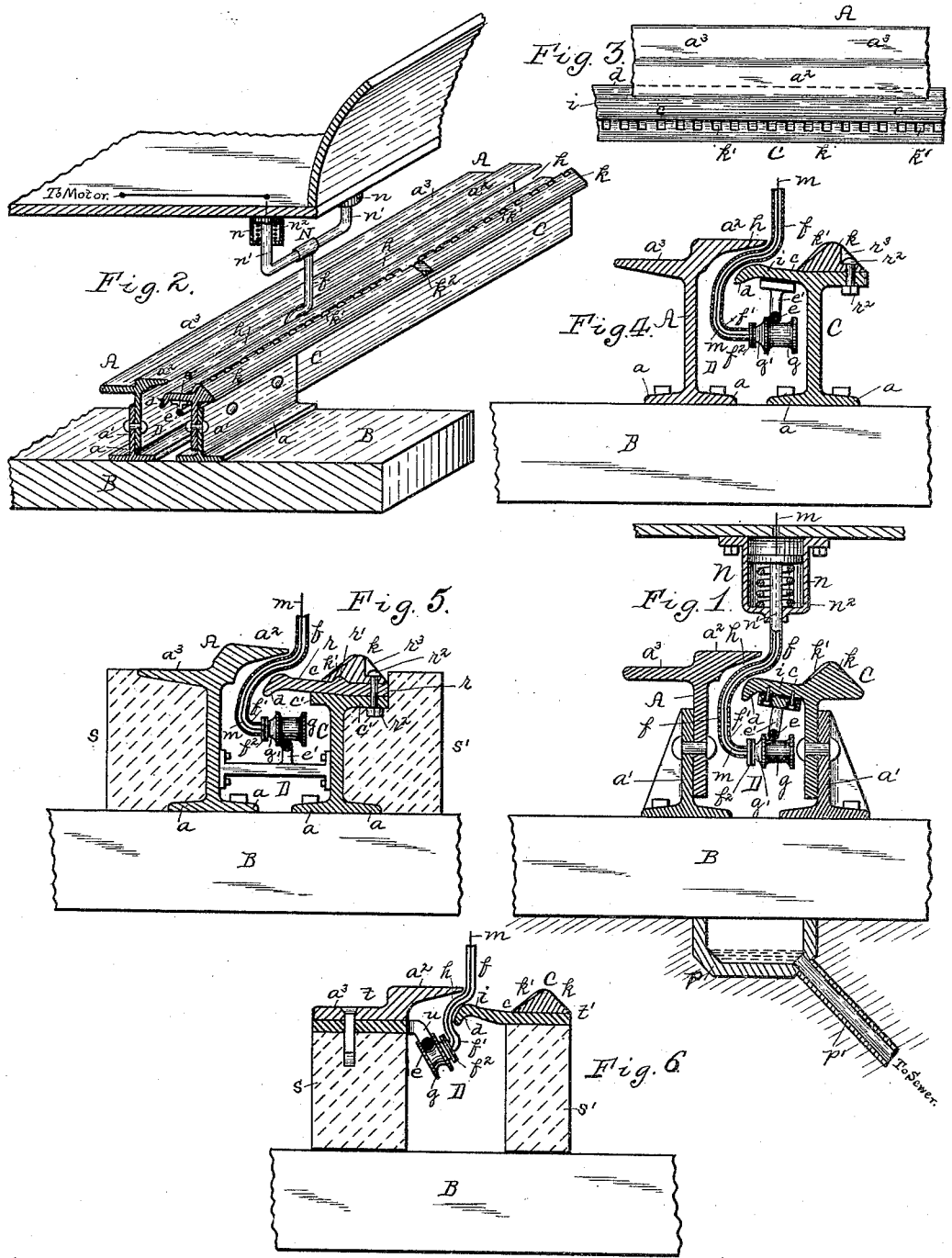

ROBERT A. STEWART, OF ALLEGHENY, PENNSYLVANIA.

UNDERGROUND CONDUIT FOR ELECTRIC RAILWAYS.

SPECIFICATION forming part of Letters Patent No. 448,461, dated March 17, 1891.

Application filed October 4, 1890. Serial No. 367,096. (No model.)

*To all whom it may concern:*

Be it known that I, ROBERT A. STEWART, a resident of Allegheny, in the county of Allegheny and State of Pennsylvania, have invented a new and useful Improvement in Underground Conduits for Electric Railways; and I do hereby declare the following to be a full, clear, and exact description thereof.

My invention relates to underground conduits for electric and other railways—that is, to underground conduits to receive the electric conductor, and within which the trolley, brush, or other suitable contact device forms connection between the same and the motor on the car. Heretofore these underground conduits have been of different forms and constructions, but have had in all cases vertical slots opening through the roadway to the chamber of the conduit, through which the arm carrying the trolley, brush, or contact device passed, so that connection was made between the electric conductor contained within the chamber of the conduit and the motor on the car. It has been found, however, that these conduits were very liable to fill up with earth, mud, and water, and so cause great leakage from the conductor within the conduit, this difficulty being so great that underground conduits have been practically abandoned for such purpose. Another difficulty experienced with these underground conduits has been that they were expensive to construct, as they required a comparatively large chamber in order to place the electric conductor in such position that it was not exposed through the slot of the conduit and could not be reached by any instruments inserted through the slot of the conduit, so that the conduit itself was made larger than desirable for the purpose. Another difficulty with these underground conduits has been in the cost of manufacture, as they required a conduit entirely separate from the rails on which the car traveled, and this necessarily increased the cost of construction very largely. Another very serious objection to these conduits was that the toe-calks of the horses' shoes were liable to enter the same and be held thereby, so that the shoe would be torn from the foot, in some cases permanently disabling the horses.

The object of my invention is to overcome these difficulties in underground conduits for railways, as hereinafter more particularly set forth.

To these ends my invention consists, generally stated, in an underground conduit extending parallel with the track and having a slot extending sidewise into the same for the passage of the trolley or other arm, so providing a chamber into which the dirt, mud, or water cannot pass directly from the wheels of the car or wagon passing over the track and preventing the rapid filling up of the chamber of the conduit from such source, and also overcoming the danger to horses in passing over the conduit, as the toe-calks cannot well enter the side slots, and if they do can be withdrawn without injury to the horse.

It also consists in providing such a conduit with an electric conductor secured to hanging supports within the chamber and underneath the flange-plate forming the upper part of the conduit.

It also consists in forming such conduit of a girder-rail having the ordinary tread for the car-wheel and a supplementary girder-rail placed adjacent to such main rail, so as to leave a space between them to form the slot for the passage of the trolley-arm.

It also consists in certain other improvements, as will be hereinafter more particularly set forth and claimed.

To enable others skilled in the art to make and use my invention, I will describe the same more fully, referring to the accompanying drawings, in which—

Figure 1 is a cross-section of a conduit embodying my invention. Fig. 2 is a perspective view thereof, showing the trolley entering the same. Fig. 3 is a plan view. Figs. 4, 5, and 6 are views showing other forms of conduits embodying my invention.

Like letters of reference indicate like parts in each.

In Fig. 1 the preferred form of my improved conduit is illustrated, and I will describe the same more particularly in connection with that figure, and will subsequently describe the other figures illustrated in the drawings. Extending along one of the ordinary girders or T-rails A of the railroad-track, which rests upon the cross-tie B, is the supplementary girder or T-rail C, leaving the space or chamber D between the two rails, which forms the conduit in which the electric conductor $e$ is supported and into which a trolley-arm $f$ enters, said trolley-arm carrying a trolley, brush, or other contact device $g$. As considering, broadly, one feature of my invention, it will be seen that the chamber D is thus formed of two girder or T rails, each supported upon the cross-tie, forming the necessary chamber without the employment of any special casting for such chamber, while the only addition to the ordinary street-railway which at the present time generally employs such girder-rails is the supplemental girder or T rail C, the cost of which is small compared with the cost of the ordinary slot or conduit located centrally of the tracks. The two girder-rails A C are preferably provided with the flanges $a$, by means of which they are secured to the cross-tie B; but they may be of the form illustrated in Fig. 1, in which suitable chairs $a'$ are employed to support the rails, such chairs resting upon the cross-ties, as is sometimes considered preferable in the construction of street-railways.

As embodying another one of the principal features of my invention, it will be noticed that the slot $h$ between the two rails A C, and which forms an entrance to the chamber D of the conduit, is what may be termed a "side slot"—that is, a slot entering sidewise into the chamber—as distinguished from the ordinary slot heretofore employed, which entered vertically into the chamber. The advantages of this are that the entrance to the slot can be formed entirely under the main tread $a^2$ of the rail A, on which the car-wheel travels, and back from the tread $a^3$ of the rail, on which the ordinary wagon-wheel travels, so that liability of mud or dirt being thrown by the wheels of either the car or a wagon directly into the slot is overcome to a large degree, the great difficulty heretofore experienced in the filling up of the underground conduit with mud and dirt being almost entirely done away with by such construction, while at the same time the other very serious difficulty in the use of conduits having longitudinal slots therein, as heretofore constructed, is overcome, as the slot, instead of extending vertically into the chamber, extends sidewise into the same, and therefore the horse passing over the slot is not liable to catch any part of his shoe in the slot, since the slot is entirely covered and protected by the main tread of the rail.

Another feature of my invention is practically illustrated in the several figures, in which the top face $c$ of the plate or flange $i$, forming the top portion of the supplementary rail, is formed on a downward incline from the point nearest the slot $h$, so that water or like liquid passing into the same will flow away from the slot $h$ instead of entering into the same, the carrying of mud or dirt held in suspension by the water into the slot from such cause being therefore avoided to a very large degree.

A still further feature of my invention is in providing the head $k$ of the supplementary rail with a transversely ribbed and grooved face $k'$, as more clearly shown in the top view, Fig. 3. The advantages of such construction are that in case the wheel of the wagon rests upon the top face $c$ of the supplementary rail it can easily pass from the same up over the inclined ribbed face $k'$, which, on account of the ribs formed therein, will catch the wheel and enable it to mount the inclined head $k$ of the rail. If desired, deep depressions, as at $k^2$, may be formed in the head $k$ of the rail at suitable intervals, such deep depressions extending down practically even with or below the inclined top face $c$ of the supplementary rail, so providing for the escape of any water from the face and preventing the same from gathering therein and therefore passing into the chamber D. In some cases, however, this head $k$ of the rail may be dispensed with, the face of the rail simply extending on a downward incline from the entrance to the slot $h$ to the outer edge of the rail, so that the water can freely flow away from the slot and so escape.

I also prefer to provide the top plate or flange $i$ of the rail C with a longitudinally-extending depending lip $d$ at the other end thereof, which depends from the slot $h$ downwardly into the chamber D, such construction protecting the electric conductor, as it prevents the employment of any tools reaching down into the slot and grasping the electric conductor where it depends from the top plate or flange $i$ of the supplementary rail. It will be seen from this construction that the chamber can be made very compact, as the electric conductor $e$, whether formed of wire or of plates, as may be desired, can be supported by insulating-brackets $e'$, which depend from said plate $i$ in the upper part of the conduit and about midway between the longitudinal rib $b$ and the main body of the rail C, and the trolley-arm $f$ can be suitably bent, so as to enter the chamber and bring the trolley into such position that it will form an underrunning contact with the electric conductor. The form of insulating-bracket employed for supporting the electric conductor $e$ need not be described, as any suitable form may be employed for the purpose. The trolley-arm $f$ is preferably formed of a tube of suitable metal, which can be bent to the proper shape and extend sidewise through the slot $h$, the arm being again bent, as at $f'$, so as to bring it into the proper position to support the trolley or contact device under the electric conductor $e$. For this purpose an insulated flange $f^2$ may be employed between the shaft $g'$, on which the trolley $g$ runs, and the tube $f$, and the wire $m$, forming connection between the trolley and the motor on the car, can pass from said shaft upwardly through the tube $f$, as shown, said wire being properly insulated from the tube, and the tube forming a protecting-sheath to the wire.

In order to maintain contact between the electric conductor $e$ and the trolley and at the same time permit the ordinary vertical or side movements of the car, I prefer to construct the trolley-arm $f$ in the manner illustrated in the drawings, Figs. 1 and 2, the arm extending up vertically after it passes through the side slot $h$, and being then connected by any suitable spring mechanism to the body of the car or to the truck thereof, either being illustrated at N, and the two being connected by any suitable spring device, which will act to draw up the trolley-arm, so as to hold the trolley $g$ in contact with the conductor $e$ and at the same time yield sufficiently in case the car or its truck rises or oscillates in its movement over the track. At the same time as the trolley-arm is bent in order to pass through the side slot it is necessary to hold such arm in proper line with the track and prevent the canting thereof, and for this purpose I employ the two guide-chambers $n$ and divide the upper end of the trolley-arm into two tangs $n'$ $n'$, which enter said chambers $n$, and provide springs $n^2$ in such chambers to draw up the trolley-arm, said chambers acting as guides for the vertical movement of the tangs or forks $n'$, and through said tangs or forks holding the trolley-arm in proper relative line to the car body or truck, while the springs $n^2$ also exert an upward pressure, such as will hold the trolley $g$ against the conductor and will hold the bent portion of the trolley-arm in proper line with the side slot and compensate for any vertical movement on the car body or truck. There is, of course, liability of the mud or water passing sidewise into the chamber D, though any great amount is prevented from the construction as above described. To carry this off I provide the conduit with a drain $p$, extending along under the chamber D, this drain being of any suitable form and communicating at intervals, as at $p'$, with a sewer, so giving a free escape to any such liquid entering the chamber. At the same time in case the lower part of the chamber should pack up with mud or dirt it can be quickly and easily washed out by the employment of a heavy stream of water flowing through the same. For this drain, which is located below the cross-ties, as shown, any suitable form of tiling may of course be employed.

While I have described the conduit as preferably formed of one of the main girder-rails and of the supplementary girder-rail, it is evident that some of my improvements may be embodied in other forms of conduits, and for this purpose I have illustrated several modifications of the same. For example, in Fig. 5 I have shown the supplementary girder-rail C formed with a flat head, as at $c'$, and having the plate or flange $r$ separate therefrom, said plate or flange extending inwardly from the head $c'$ and forming the inclined top face $c$ to that portion of the conduit-chamber and said plate carrying the depending lip $d$. I have also formed the head $k$ separate from the plate $r$, said head being held in place by a V-shaped rib $r'$ on the plate $r$ and by bolts or rivets $r^2$, fitting in depressed seats $r^3$ in the head $k$. Such head could of course be formed with the plate $r$, if desired. The principal advantage of such construction is the ease of access to the conduit-chamber, as all that is necessary to obtain access thereto is to remove this plate $r$, and where the electric conductor is connected to said plate it can also be removed in this way for repair. In Fig. 5 I have also shown the electric conductor supported from the lower part of said chamber—that is, so that the trolley forms an overrunning contact therewith instead of the underrunning contact as in the other figures.

In Fig. 6 I have shown the conduit made of the ordinary flat rails supported on wooden girders or runners, the girders or runners $s$ $s'$ being properly supported on cross-ties, as is the usual construction in such case, and the main rail $t$ being supported on the wooden girder $s$, while the supplementary rail $t'$ is supported on the wooden girder $s'$, the space between the two forming the chamber of the conduit. I have also shown the electric conductor depending from the bracket $u$ extending out from under the main rail, as distinguished from extending from under the supplementary rail, such construction being found desirable under some circumstances. In other particulars the construction of these chambers is substantially the same as that indicated above.

In the use of the conduit constructed as above described the trolley-arm or other connecting-arm passes down from the car and extends sidewise through the side slot $h$ and supports the trolley or other contact device in the conduit-chamber D and in contact with the electric conductor, it being held in contact by the springs $n^2$ in the guide-boxes $n$. The current taken up by the trolley from the electric conductor passes through the insulated wire $m$ within the trolley-arm and thence to the motor, passing through and actuating the same and forming contact through the wheels with the ground or the return wire, as is usual in such circuits. The insulated conductor leading from the trolley is therefore perfectly protected by the tubular trolley-arm, and as the electric conductor is entirely inclosed within the chamber there is practically no liability of accident from contact therewith, while the conductor cannot be reached by any ordinary instrument, so that accident from contact with the same is prevented. At the same time, as the slot entering the conduit-chamber is a side slot, the difficulty of mud and dirt passing into the same is overcome to a very large extent, such mud or dirt striking on the head $a^2$ of the main rail or the inclined face $c$ of the supplementary rail and being carried by the inclined face of such supplementary rail away from the side slot $h$, so preventing the entrance of the same into the chamber. Any such dirt and water passing into the rail-chamber will naturally escape through the drain $p$ at the base thereof and enter into the main sewer; and in case of any such accumulation within the chamber as to interfere with the operation thereof the chamber can be easily and quickly washed out, so driving such materials down into the sewer. At the same time any water which collects upon the face of the supplementary rail will flow away from the slot on account of the face $c$, inclined downwardly from such slot. All danger to driving over the rail is also practically overcome, as the side slot is in such position that the toe-calks of the horse's shoes cannot catch and hold therein, a great source of danger from the employment of such underground conduits being thus overcome.

While I have described my improvements in connection with conduits for electric conductors, it is evident that certain particulars thereof are also applicable to the ordinary cable road, and they are included within my invention.

What I claim as my invention, and desire to secure by Letters Patent, is—

1. An underground conduit for electric and like railways, having a chamber extending parallel with the rail and having a slot extending sidewise into the chamber for the passage of the trolley-arm or like device, substantially as and for the purposes set forth.

2. An underground conduit for electric and like railways, formed of a girder-rail having a head or tread thereon and a supplementary rail adjacent thereto to form a chamber between the two, one rail overlapping the other and so forming a slot extending sidewise into the chamber, substantially as and for the purposes set forth.

3. An underground conduit for electric railways having a chamber extending along with the track and having a slot extending sidewise into the same for the passage of the trolley-arm, and provided with an electric conductor secured to hanging supports within said chamber, substantially as and for the purposes set forth.

4. An underground conduit for electric and like railways, having a chamber extending longitudinally of the track and having a slot extending sidewise into the same, the top of said chamber being formed of a plate or flange, and the top face of said plate being inclined downwardly from the slot, substantially as and for the purposes set forth.

5. An underground conduit for electric and like railways, formed of rails adjacent to each other, so as to form a slot extending sidewise into the longitudinal chamber of the conduit, the plate forming the lower side of the slot having the incline-faced head $k$ ribbed and grooved transversely, as at $k'$, substantially as and for the purposes set forth.

6. In conduits for electric and like railways, the combination, with a main rail, of the supplementary plate or flange $i$, extending toward the main rail and under the edge thereof, so as to form a side slot between them for entrance into the conduit-chamber, said plate having the depending lip $d$ extending down into the chamber, substantially as and for the purposes set forth.

7. In conduits for electric and like railways, the combination, with a main rail, of the supplementary plate or flange $i$, extending toward the main rail and under the edge thereof, so as to form a side slot between them for entrance into the conduit-chamber, said plate having the depending lip $d$ extending down into the chamber, and the electric conductor $e$, secured to brackets depending from said plate $i$, substantially as and for the purposes set forth.

8. In electric railways, the combination of an underground conduit having a chamber extending longitudinally of the track and a slot extending sidewise into said chamber with a trolley or like arm extending down from the car or truck and bent corresponding to the said side slot, so as to enter into the chamber of the conduit, substantially as and for the purposes set forth.

9. In electric railways, the combination of an underground conduit having a chamber extending longitudinally of the track and a slot extending sidewise into said chamber with a trolley or like arm extending down from the car or truck and bent corresponding to the said slot, so as to enter into the chamber of the conduit, and said arm being forked at the upper end and having spring connections with the car or its truck, substantially as and for the purposes set forth.

In testimony whereof I, the said ROBERT A. STEWART, have hereunto set my hand.

ROBERT A. STEWART.

Witnesses:
J. N. COOKE,
F. G. HAY.